(12) United States Patent
Wald

(10) Patent No.: US 7,480,676 B2
(45) Date of Patent: Jan. 20, 2009

(54) CHASING ENGINE FOR DATA TRANSFER

(75) Inventor: Joe Wald, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 251 days.

(21) Appl. No.: 11/397,494

(22) Filed: Apr. 3, 2006

(65) Prior Publication Data

US 2006/0224637 A1 Oct. 5, 2006

Related U.S. Application Data

(60) Provisional application No. 60/667,351, filed on Apr. 1, 2005.

(51) Int. Cl.
 *G06F 17/30* (2006.01)
(52) U.S. Cl. ....................................... 707/102; 707/200
(58) Field of Classification Search ................. 707/1–3, 707/10, 100–102, 200–204, 9; 713/182; 715/200
See application file for complete search history.

(56) References Cited

U.S. PATENT DOCUMENTS

| 5,745,910 | A | * | 4/1998 | Piersol et al. ................ 715/210 |
| 5,818,447 | A | * | 10/1998 | Wolf et al. ................... 715/752 |
| 6,925,477 | B1 | * | 8/2005 | Champagne et al. ........ 707/203 |
| 6,931,390 | B1 | | 8/2005 | Zait et al. |
| 7,010,742 | B1 | * | 3/2006 | Hsu et al. ................... 715/208 |
| 7,146,376 | B2 | * | 12/2006 | Dettinger et al. ............ 707/102 |
| 2005/0119994 | A1 | * | 6/2005 | Matsunami et al. ............ 707/1 |
| 2005/0187974 | A1 | * | 8/2005 | Gong ...................... 707/104.1 |
| 2006/0020619 | A1 | | 1/2006 | Netz et al. |
| 2006/0143464 | A1 | * | 6/2006 | Ananthanarayanan et al. ......................... 713/182 |

* cited by examiner

*Primary Examiner*—Mohammad Ali
*Assistant Examiner*—Marc R Filipczyk
(74) *Attorney, Agent, or Firm*—Robert P. Lord; Bryan P. Galloway

(57) ABSTRACT

A data repository defined by a single logical specification includes a data store comprising a plurality of tables and a view of the plurality of tables, a data dictionary comprising a meta-table and means to generate the data store, wherein the meta-table is generated from the single logical specification defining the data repository, and a chase engine configured to transfer a plurality of data within the data store, wherein the chase engine generates a plurality of chasing procedures based on a chasing specification, wherein the chasing procedures define a manner to transfer the plurality of data.

20 Claims, 4 Drawing Sheets

CHASING ENGINE FOR DATA TRANSFER

CROSS-REFERENCE TO RELATED APPLICATIONS

This application claims priority of U.S. Provisional Patent Application Ser. No. 60/667,351 filed on Apr. 1, 2005. The Provisional Application is hereby incorporated by reference.

BACKGROUND OF INVENTION

1. Field of the Invention

The invention relates generally to database management. More particularly, embodiments relate to methods to transfer data by setting chase rules.

2. Background Art

In many industry applications, a large amount of data is generated, collected, and deposited to/transferred between databases. For example, in the oil and gas industry especially during oil Exploration and Production (E&P), geological formation data are collected in the exploration stage. These geological formation data are stored for the use of making decisions on where to drill. In the production stage, data on oil and gas flow rates are collected to monitor the production processes. A large investment is often needed to build a database to store the aforementioned data. It is essential that all the data are stored and managed in such an efficient way that subsequent search and use of the data are facilitated.

The market of local DBMS is dominated by client-server products called SQL Servers, developed by Sybase, Informix, and Microsoft. SQL Servers are based on the Structural Query Language (SQL). SQL Servers are popular in low-end applications in small businesses and local offices where the local DBMS run on stand-alone desktops and laptops. SQL Servers are low cost, require simple administration, and generally provide good performance, as a result of being based on the popular Windows NT® technology (Windows NT® is a registered trademark of Microsoft Corporation, USA). On the other hand, Oracle® (Oracle is a registered trademark of Oracle Corporation, USA) dominates the high-end database market (such as corporate and national repositories) because of its high scalability, reliability, and a wide assortment of features. Oracle® and SQL Server have many differences, and it is often difficult to support applications on both Oracle® and SQL Server. Software vendors (and hence users) are often forced to choose one platform over the other. Migrating data from one platform to another and merging data may require extensive effort. Further, a customized DBMS is often required to run on different platforms.

In the following context, a database instance and a DBMS are collectively referred to as a "data repository." A database instance can have many data stores. A data store contains a collection of tables and views. A table is an array of data. A view is a particular way of looking at a table, and the change of a view does not affect the physical organization of a table. Users are typically not granted access to the tables directly. Rather, they are granted access to views of the tables. A view in a data store provides a standard interface to that data store. Tables and views can be private or public. Conventionally, for a database entity XYZ, a private implementation of a table is represented with XYZ_, and a public interface view is represented with XYZ. The data in a data repository are usually related among themselves, and such a relation is usually defined by a logical specification in the form of a "data model."

In Oracle® and SQL Server, as well as in other commercial DBMS, a database may include many subsets of entity types in the data model, referred to as "domains." For example, in an oilfield service setting, the domains include Drilling, Production, Log, Reservoir, Seismic, and Well. These domains could have very different sizes and complexity. For example, the Well domain could be relatively small and simple, while the Production domain could be large and complex.

Basic operations involving a database include: (1) search operation, which allows a user to specify search conditions such that the retrieved set of data matches the search conditions; (2) insertion, by which a new set of data with given attributes are inserted into a table; (3) updating, which modifies the attributes of a selected data set from a table into new values; and (4) deletion, which delete a data set from a table.

A major part of data management is loading new data into the data repository. Some of the new data are modifications of existing entities while some data are entirely new entry to the data repository. It is important to set up rules for deciding whether the incoming data match existing entities. Part of the rules is to ensure that some of the incoming data have mandatory values and that referential integrity is satisfactory.

In the case of a violation of the rules, the DBMS should have options to completely reject the incoming data set, or to allow partial loading of a consistent subset of the incoming data. If a violation causes a complete abortion of a transaction, it is potentially dangerous because the database is in an inconsistent state unless all the previously rejected data can be reloaded in a single, subsequent transaction. On the other hand, if referential integrity is enforced while loading data, the incoming data must be in the right order without modifying the manner in which the incoming data is entered. In some cases the incoming data includes cyclic references and thus there is no way to keep insert incoming data in the right order without modifying the manner in which the incoming data must be entered into the database is to break the cycles.

In addition, a DBMS catches and reports errors one at a time. Hence, when there are many errors in a data set, it is important to see and fix systematic errors. It is also important to decide whether to repeatedly fix newly discovered errors and try again or to reject the data set because it is inconsistent.

In a general sense, data transfer refers to the exporting of data from one data store and the importing of that data into another data store. Selecting data to export from the source data store should be an efficient and accurate process. It is painstaking to specify every single entity instance within a data store to be transferred. Instead, a user prefers to specify the transfer in logical terms. For example, the user may want to transfer data about a specific high production oil well (i.e., a "gusher") from the centralized data store to the rig site data store. Accordingly, one must formalize what it means to transfer data about a well. For example, a user may want to define that the transfer of well data includes the transfer of data about all the boreholes belonging to that well. This is an example of a chase rule, where the term "chase" refers to the process of obtaining all the data based on a simple rule. A chasing "engine" is used to compute the entity instances to be transferred based on an initial set of selected entity instances (known as seeds) and a set of chase rules, where the term "engine" refers to a code generator.

SUMMARY OF INVENTION

In general, in one aspect, the invention relates to a data repository. The data repository is defined by a single logical specification, comprising a data store comprising a plurality of tables and a view of the plurality of tables, a data dictionary comprising a meta-table and means to generate the data store, wherein the meta-table is generated from the single logical specification defining the data repository, and a chase engine configured to transfer a plurality of data within the data store, wherein the chase engine generates a plurality of chasing procedures based on a chasing specification, wherein the chasing procedures define a manner to transfer the plurality of data.

In general, in one aspect, the invention relates to method of performing data chasing. The method comprises obtaining a chasing specification defining at least one domain of a data repository, generating a plurality of chasing procedures based on a chasing specification, and transferring a plurality of data within the data repository, wherein the chasing procedures define a manner to transfer the plurality of data.

In general, in one aspect, the invention relates to a computer readable medium. The computer readable medium comprises software instructions stored thereon to perform: obtaining a chasing specification defining at least one domain of a data repository, and generating a plurality of chasing procedures based on a chasing specification, and transferring a plurality of data within the data repository, wherein the chasing procedures define a manner to transfer the plurality of data.

Other aspects and advantages of the invention will be apparent from the following description and the appended claims.

DETAILED DESCRIPTION

Figure 1:
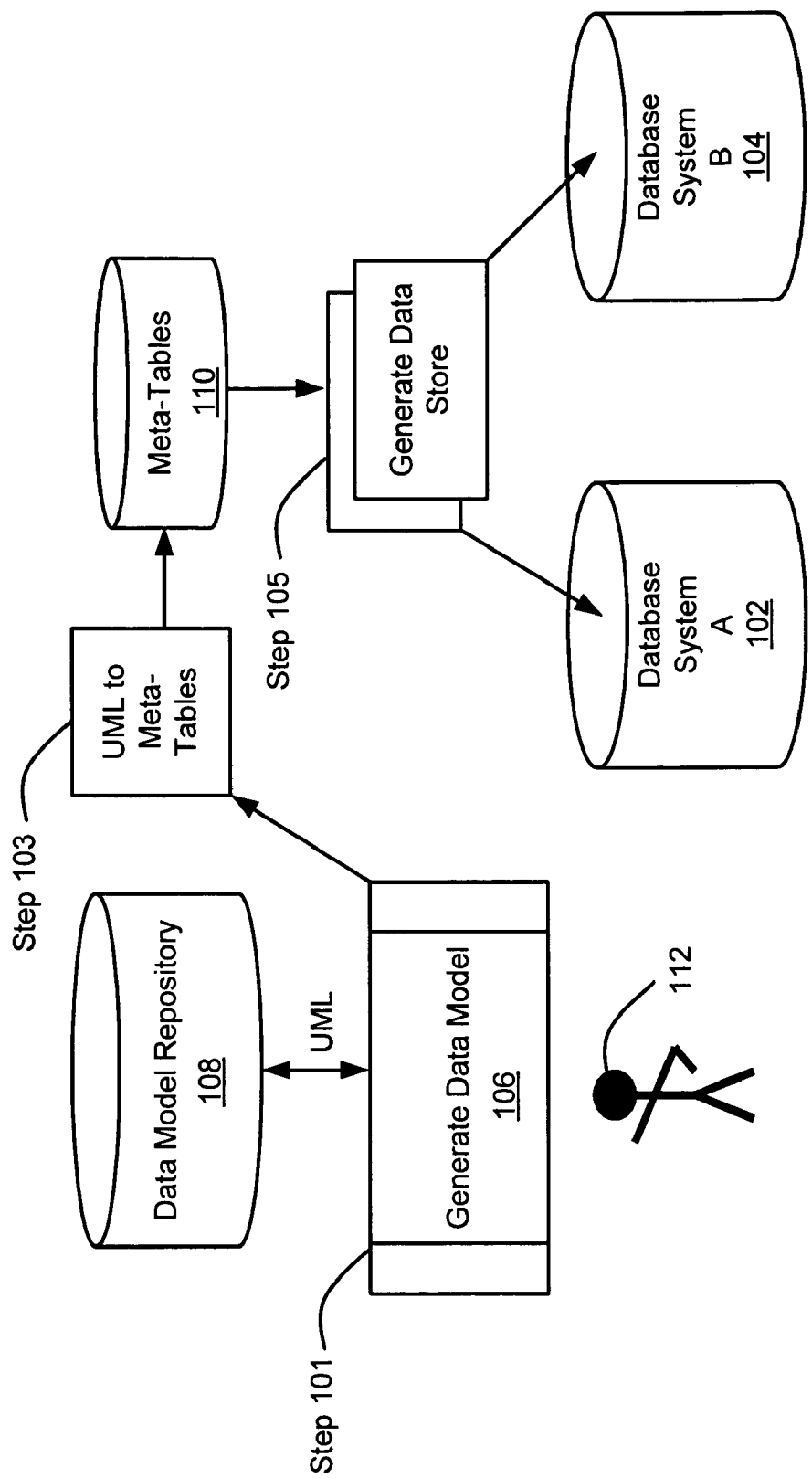
FIG. 1 shows a system diagram of components of a data repository in accordance with one or more embodiments of the invention.

Exemplary embodiments of the invention will be described with reference to the accompanying figures. Like elements in the figures are denoted by like reference numerals for consistency.

In the exemplary embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In one aspect, one or more embodiments of the invention relate to methods for data transfer. Some embodiments of the invention relate to methods for data transfer provided by a chasing engine and a system including a chasing engine.

In one or more embodiments of the invention, a customized data repository is used for implementing one or more aspects of the invention summarized above and described below. In one or more embodiments of the invention, this repository is used for applications in petroleum E&P, however one skilled in the art will appreciate that the architecture of the system is not limited to this application.

FIG. 1 shows a system diagram of components of a data repository in accordance with one or more embodiments of the invention. In one or more embodiments, the data repository (100) of the invention is designed to execute on a variety of underlying database platforms, including Database System A (102) and/or Database System B (104). In one or more embodiments of the invention, the data repository (100) is built using a commercial tool, such as QDesigner, which is based on the Unified Modeling Language™ (UML). The high-level specification of the data model, which is generated in UML in Step 101, is stored in a UML repository (104). A script (e.g., a Visual Basic script) is used to translate the UML specification of the data model into a relational representation in meta-tables (110) (Step 103). The meta-tables (110) are used the basis to generate distinct implementations of data stores on the underlying database platforms (Step 105), such as Database System A (102) and/or Database System B (104) (e.g., Oracle® and/or SQL Server). In one or more embodiments, the invention provides optimal performance and similar behavior on both of the database platforms. Further, in one embodiment of the invention, the meta-tables (110) are also used to automatically generate HTML documentation of the data model. A user (112) may have access to views (not shown) in the data repository (108).

In the examples provided below, the methods of database merging are implemented and described using a particular format. Portions of computer code and or pseudo-code are also used to show embodiments of the present invention in a specific form. However, those skilled in the art will recognize that, these methods do not depend on a particular platform, a particular data repository, or a specific programming language to function. Rather, embodiments in accordance with the present invention can be applied to many different DBMS, using many different ways to program computer software instructions with various types of programming languages and implementations.

In order to better understand embodiments of the present invention, it is helpful to describe the exemplary data repository referred to below as Seabed. Seabed has services embedded in the database, allowing optimal performance by minimizing context switching, i.e., minimizing network traffic between a client and a server. In one embodiment of the invention, the database is accessible locally as well as remotely.

Seabed can support the same set of applications on various database platforms, such as Oracle® and SQL Server, by providing the same data model and similar behaviors on both platforms. In one or more embodiments, Seabed is intended to be applied to various technology fields by being adapted for deployment on laptops on sites of oil wells, in small office environments, as well as on mainframes for large-scale data repositories. In addition, Seabed provides open access for third party applications. In essence, Seabed involve a logical data model and a physical implementation of that data model on a variety of database platforms, including both Oracle® and SQL Server, in a manner described above in relation to FIG. 1.

The terminology used by Oracle® is different from that used by SQL Server. Accordingly, for the purposes of the present application, the term "account" refers to a user on Oracle®, and refers to a database on SQL Server. The term "user" refers to the login account of a person on Oracle®, and refers to a login into a session in SQL Server. Also, when referring to a database instance, one skilled in the art will appreciate that each instance can have many users.

Figure 2:
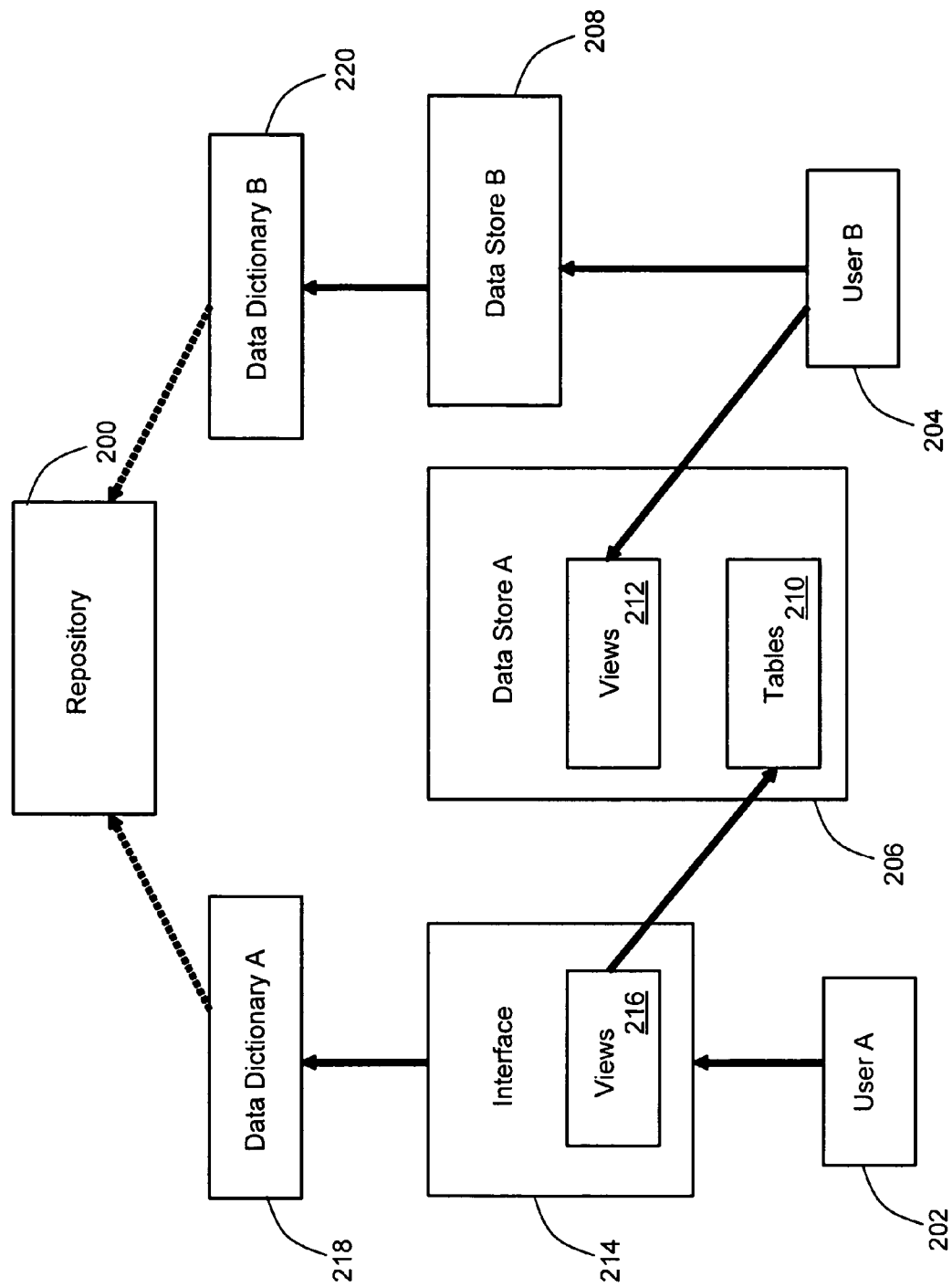
FIG. 2 shows a system diagram of a high level architecture of a data repository in accordance with one or more embodiments of the invention.

FIG. 2 shows a system diagram of a high level architecture of a data repository, such as Seabed, in accordance with one or more embodiments of the invention. An important feature of the data repository (200) of the present invention is that a user (User A (202), User B (204)) always logs in as him/herself with a tag identifying this user (User A (202), User B (204)). The user (User A (202), User B (204)) does not log in using simple authentication (i.e., by simply being given privileges to cross a security shell protecting the database). The same log in procedure and technique also applies when using a third party application to access the data repository (200) (versus logging directly to the repository). That is, if the user (User A (202), User B (204)) logs in properly, the user (User A (202), User B (204)) has exactly the same database rights when using an application as when directly using SQL.

A data store (Data Store A (206), Data Store B (208)) (sometimes called a project) is an account. The data store (Data Store A (206), Data Store B (208)) contains a collection of tables (210) and views (212). Users (User A (202), User B (204)) are not granted access to the tables (210) directly; instead, the users (User A (202), User B (204)) are granted access to views (212) over tables (210). The views (212) in a data store (Data Store A (206), Data Store B (208)) provide the standard interface to that data store (Data Store A (206), Data Store B (208)).

In the data repository (200), an auxiliary interface (214) is also an account. The auxiliary interface (214) contains a collection of views (216) of the tables (210) in a data store (i.e., Data Store A (206)). Users (User A (202), User B (204) can also be granted access to the views (216) in an auxiliary interface (214). An auxiliary interface (214) is intended to support customized services. For example, in a data store, all measurement data (such as mass) are stored using Système International units (e.g., kg). The standard interface does not provide a built-in unit conversion service. However, in one or more embodiments of the invention, auxiliary interfaces can be defined to support unit conversion. The same data store can have auxiliary interfaces that support the English unit system, a Production unit system, or a customized unit system. One skilled in the art will appreciate that each data store (Data Store A (206), Data Store B (208)) may have zero or more auxiliary interfaces (214).

Continuing with FIG. 2, a data dictionary (e.g., Data Dictionary A (218), Data Dictionary (220)) is also treated as an account. Each data dictionary (Data Dictionary A (218), Data Dictionary (220)) contains meta-tables (not shown) that describe a particular version of the data model. Every data store (Data Store A (206), Data Store B (208)) and interface (314) is generated from a particular data dictionary (e.g., Data Dictionary A (218), Data Dictionary (220)). A data dictionary (Data Dictionary A (218), Data Dictionary (220)) also contains reference tables that are shared by all data stores (Data Store A (206), Data Store B (208)) of that particular version. One skilled in the art will appreciate that because the data repository (200) of the present invention allows a database instance to contain more than one data dictionary, clients can upgrade data stores individually from one version to another and can safely extend one data dictionary without impacting data stores generated from other data dictionaries.

A system account, referred to as "SDS_Sys" on both Oracle® and SQL Server platforms, is an account of the data repository (200) that keeps track of all the data stores (Data Store A (206), Data Store B (208)), interfaces (214), and data dictionaries (Data Dictionary A (218), Data Dictionary (220)) in a single database instance. One skilled in the art will appreciate that a database instance can have only one system account and that the system account contains stored procedures for securely managing the privileges of a user (User A (202), User B (204)).

Before database merging is enforced, any user (User A (202), User B (204)) can be a regular user in the sense that users need not be created by the system. This allows user management to be handled more easily by systems built on top of the data repository. It also allows users created by a database administrator or third party tool to access the data stores (Data Store A (206), Data Store B (208)) subject to the privileges managed by system.

One skilled in the art will appreciate that most of the services in the data repository are available by making simple calls using SQL, such as select, insert, update, and delete. These services are implemented via views, instead of triggers on views and table triggers within Oracle® and/or SQL Server. In one or more embodiments of the invention, objects and underlying tables are generated automatically by the meta-system. Some of the services, such as data merge and data transfer, are available only by invoking stored procedures in the database.

Figure 3:
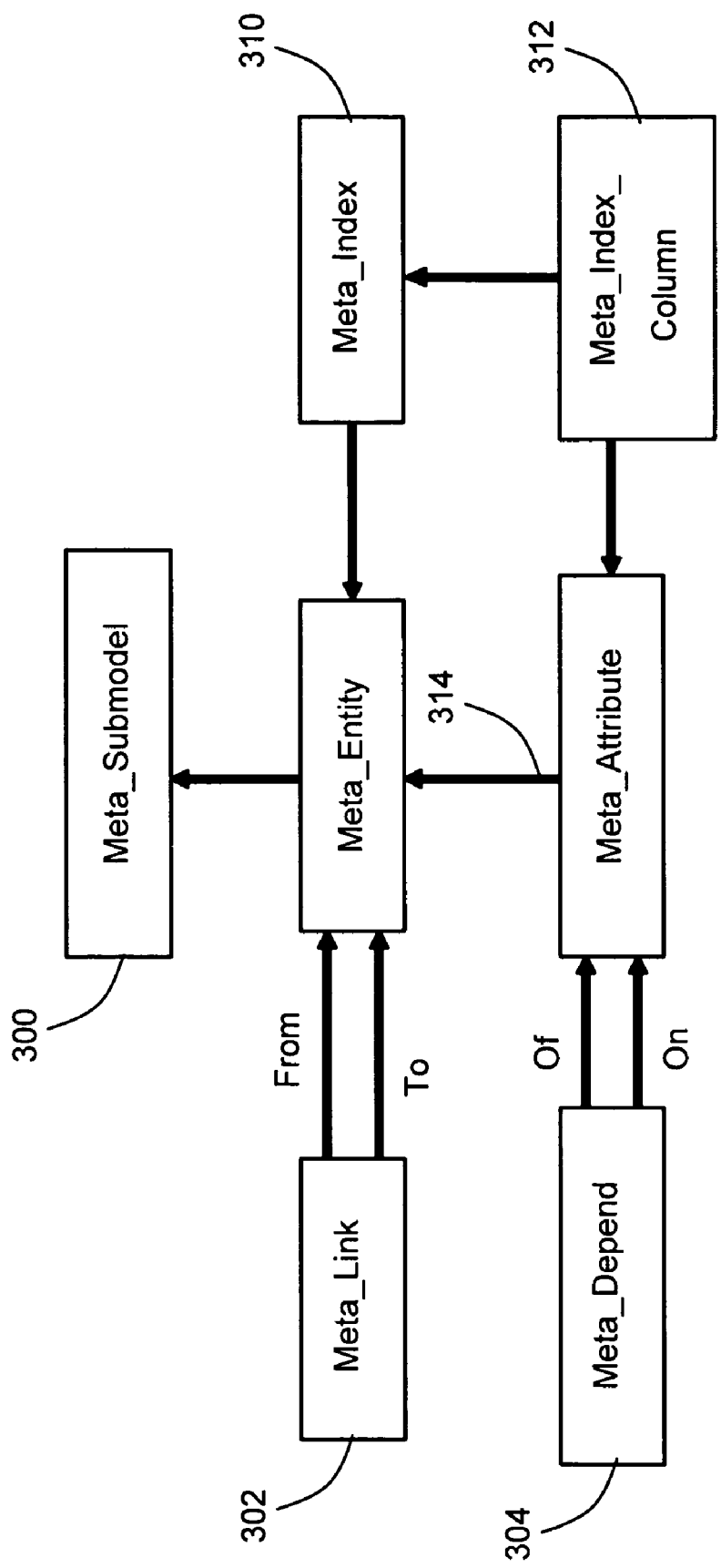
FIG. 3 shows a diagram of entities and relationships of meta-model for the data repository in accordance with one or more embodiments of the invention.

FIG. 3 shows a diagram of entities and relationships of meta-model for the data repository in accordance with one or more embodiments of the invention. Specifically, the data repository of the present invention uses meta-tables to describe a data model and generates tables and views from the meta-tables. Meta-tables are also used to configure services implemented in the database via table triggers and instead of triggers. As shown in FIG. 3, the boxes (300, 302, 306, 308, 310, 312) contain the names of the meta-tables. An arrow (e.g., 314) from one box to another box represents a reference (e.g., there is a reference from Meta_Attribute (308) to Meta_Entity (306)). HTML (web-based) documentation for all entity types in the data model is generated automatically from the meta-tables. The web-based document has many live links, which allow convenient navigation.

The repository of the present invention provides open access via standard SQL. Moreover, the invention ameliorates the differences between Oracle® and SQL Server so that the same set of applications can execute on both platforms. The implementation of the invention in both Oracle® and SQL Server is described below. One skilled in the art will appreciate that while the implementation of the invention described below is described with regard to only Oracle® and SQL Server, the implementation may be performed in a similar fashion on any database platform or management system (e.g., Sybase, Informix, DB2, Oracle®, SQL Server, or other similar DBMS).

The high-level data transfer strategy employed within Seabed is to first export a coherent set of data from the source data store. This data set is then imported into a staging area for the target data store. Subsequently, a merge engine is invoked to merge the data into the target data store.

How to select data to export from the source data store is an extremely important to a DBMS. It is a painstaking process to specify every single entity instance to be transferred. Instead, a user would prefer to specify the transfer in logical terms using a chasing engine. In one or more embodiments of the invention, the chasing engine is implemented via a set of stored procedures in a Seabed data dictionary (e.g., Data Dictionary A (218) and Data Dictionary (220) shown in FIG. 2 and described above).

Figure 4:
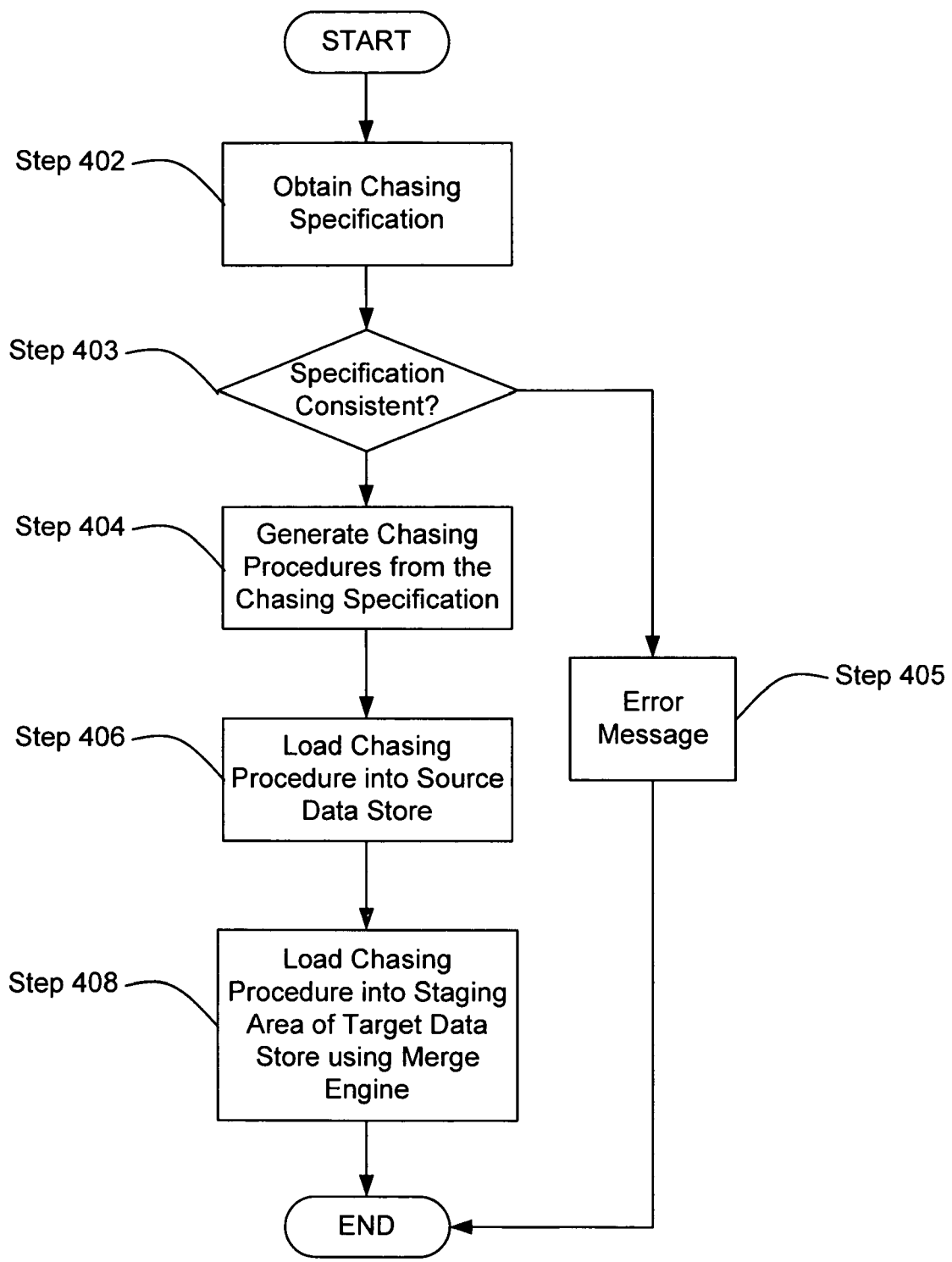
FIG. 4 shows a flowchart for performing chasing in a database in accordance with one or more embodiments of the invention.

FIG. 4 shows a flowchart for performing chasing in a database in accordance with one or more embodiments of the invention. Initially, a chasing specification is obtained (Step 402). Next, chasing procedures are automatically generated from the chasing specification (Step 404). However, prior to generating the chasing procedures, the specification is analyzed for consistency (Step 403). An error message or warning is produced if the specification is not consistent (Step 405). Once generated, the chasing procedure is loaded into the source data store (Step 406). Finally, the chasing procedure is loaded into the staging area of the target data store using the merge engine (Step 408).

The details of the each of the aforementioned steps are described in detail below. Additional information regarding the merge engine and the process associated with the merge engine may be found in U.S. patent application Ser. No. 11/397,947, entitled "METHOD AND SYSTEM FOR DYNAMIC DATA MERGE IN DATABASES," filed on Apr. 3, 2006, which is hereby incorporated by reference, and Provisional Application Ser. No. 06/667,351 entitled "DYNAMIC DATA MERGER AND LICENSING" filed Apr. 1, 2005, which was previously incorporated by reference.

As described above, the chasing problems are addressed with automatically generated stored procedures. The chasing specification used to generate those stored procedures, which is obtained to start the process in Step 402 of FIG. 4, is discussed in greater detail below.

In one or more embodiments of the invention, an administrator is typically the person who defines the chasing specification in order to distinguish him/her from users that simply invoke the chasing procedures. The administrator is expected to have some domain expertise and have some database privileges but is not assumed to have database expertise. Hence, it is important for the chasing specification to be simple. The following sub-sections describe the three tables in the chasing specification, in accordance with one or more embodiments of the invention. One skilled in the art will appreciate that a Graphical User Interface (GUI) may be used in accordance with one or more embodiments of the invention, to provide definitions to facilitate the population of these tables.

In one or more embodiments of the specification, the chasing specification is loaded by populating the following files:
Chase.dat: The chase rule
Cycle.dat: The chase rules with cycles (if any)
Ignore.dat: The entities to be ignored
Include.dat: The entities for which all instances should be included Chase rules are used to define the chasing specification. Basically, a chase rule says, "if entity X has been selected, then follow link L to/from entity Y and select entity Y." Given a starting set of seed entities, chase rules are applied in the correct order to determine the complete set of entities to be selected for data transfer.

In one or more embodiments of the invention, a SDS_Chase_Rule table is used to describe the chase rules. It contains the following attributes: Entity, Direction, and Link. The Link is always from the specified entity. The Direction specifies whether the link should be followed from an entity (in the forward direction) or to an entity (in the backward direction). The exact meaning of these attributes is easier to understand by looking at examples below.

The following is an excerpt from a sample data file (Chase.dat) used to populate the SDS_Chase_Rule table:

```
Activity_Program < Involved_Entity=AFE
Activity_BA_Invl < Activity
Activity_Program < Well
Activity_Program_Approval < Activity_Program
Activity_Program_Well_AFE < Activity_Program
Activity_Program_Well_AFE < Well_AFE
Address_Role < Address
Additional_Remarks < IT_Object
Base_Fluid_Used < Fluid_Formulation
Base_Fluid_Used > Generic_Wellsite_Fluid
Borehole < Well
```

-continued

```
Borehole_Activity_Detail < Activity
Borehole_Activity_Program < Borehole
Conv_Core_Acquisition < Borehole
Conv_Core_Acquisition > Core_Bit_Used
...
```

In the above sample data file, an Entity, for example, "Activity_Program," is followed by a Direction, either backward ("<") or forward (">"), followed by the name of the Link, for example, "Well," which is an entity domain of a link specified in the Meta_Link table. Often the name of a link is the same as the domain of the link. In the previous example chase rules, the Borehole link from Conv_Core_Acquisition refers to a Borehole while the Core_Bit_Used link from Conv_Core_Acquisition refers to a Core_Bit. Most chase rules for full data transfer tend to be in the backward direction.

Sometimes the entity domain of an abstract link is very broad. For example, the domain of the Activity_Program.Involved_Entity link can be any entity. In such cases, it is possible to narrow the cases in which the chase rule is triggered by specifying the actual entity type for which the rule should be triggered by following the link name with "=" and the narrowed domain. Thus, an Activity_Program should be selected only when it has an Involved_Entity link to a selected AFE. It is acceptable to repeat the same the same rule with different narrowed domains. One skilled in the art will appreciate that by narrowing a domain the amount of chasing is reduced and cycles can also be broken.

In the case of a chase rule in the forward direction, the Source refers to the entity specified in the chase rule while the Target refers to the domain of the link (perhaps narrowed). In the case of a chase rule in the backward direction, the Source refers to the domain of the link, while the Target refers to the entity specified in the chase rule.

Domain expertise is not always required when defining the chasing rules. If the administrator wants to chase from entity X to entity Y and only one path exists in the data model from X to Y, the system can automatically infer what path to follow. If, however, multiple paths exist, then some domain expertise is required to decide which set of paths are to be followed.

Sometimes, a data transfer workflow requires all instances of a given entity type to be transferred even though all instances have not been selected by the chase rules. For example, a transfer all instances of Person may be desirable even though some instances may not have a relationship in the current data transfer. Specifying when all instances of an entity type are to be included allows for improved efficiency in the chasing procedures. In one or more embodiments of the invention, the SDS_Chase_Include table is used to specify such entity types. The following is a sample data file (Include.dat) used to populate the SDS_Chase_Include table:

```
Activity_Template
AFE
BA_Group
Business_Associate
Company
Coordinate_System
Feature_Boundary
Field
Person
Property_Agreement
```

Because the Seabed data model allows abstract references, a determination of the type of entity that will be discovered by a chasing rule is not always possible. In one or more embodiments of the invention, the SDS_Chase_Ignore table is used to specify which entity types can be safely ignored during the chasing procedure. This table allows the administrator to assert that the current workflow will never encounter the specified entities and thus no effort should be expended in chasing from them. Specifying which entity types can be ignored allows improved efficiency in the chasing procedures. One skilled in the art will appreciate that is not necessary to populate the SDS_Chase_Ignore table. The following is an excerpt from a sample data file (Ignore.dat) used to populate the SDS_Chase_Ignore table:

|  |
|---|
| Acquisition_2D |
| Acquisition_3D |
| Act_Tmpl_BA_Role |
| Act_Tmpl_Data_Dependency |
| Act_Tmpl_Data_Role |
| Act_Tmpl_DataFlow_Arc |
| Activity_Program_Status |
| Application_Project |
| Area |
| ... |

In one or more embodiments of the invention, when populating the SDS_Chase_Rule table, if a link is part of a cycle, then the Head attribute must be set to the name of the entity at the head of the cycle and the Offset attribute must be set to the order in which the current rule is triggered in the cycle.

The following is a sample data file (Cycle.dat) used to populate Entity, Direction, Link, and now Offset and Head in the SDS_Chase_Rule table:

| | |
|---|---|
| Facility_Composition < Whole_Facility | 1 Facility |
| Facility_Composition > Part_Facility | 2 Facility |
| Facility_Connection < From_Facility | 1 Facility |
| Facility_Connection > To_Facility | 2 Facility |
| Gas_Lift_Utilization < Super_Activity | 1 Activity |
| Position > Coordinate_System | 1 Position |
| Position < Coordinate_System | 2 Position |
| Gas_Lift_Utilization < Gas_Lift_Valve | −1 |

The first rule is from Facility to Facility_Composition (backward direction via the Whole_Facility link). The second rule is from Facility_Composition to Facility (forward direction via the Part_Facility link). Clearly this is a cycle of a length 2. Likewise there is a cycle of length 2 between Facility and Facility_Connection.

Since both cycles involving Facility are annotated as separate cycles, the order of chasing will be as follows:
1) Facility>Facility_Composition (Whole_Facility), Facility>Facility_Connection (From_Facility)
2) Facility_Composition (Part_Facility)>Facility, Facility_Connection (To_Facility)>Facility That is, the two cycles are traversed in parallel. Now suppose the cycles involving Facility were annotated as follows:

| | |
|---|---|
| Facility_Connection < From_Facility | 1 Facility |
| Facility_Connection > To_Facility | 2 Facility |
| Facility_Composition < Whole_Facility | 3 Facility |
| Facility_Composition > Part_Facility | 4 Facility |

The order of chasing would be as follows:
1) Facility>Facility_Connection (From_Facility)
2) Facility_Connection (To_Facility)>Facility
3) Facility>Facility_Composition (Whole_Facility)
4) Facility_Composition (Part_Facility)>Facility This is considered to be one cycle of a length 4 (Facility>Facility_Composition>Facility>Facility_Connection>Facility). One skilled in the art will appreciate that the result produced by triggering the rules in serial can result in more selections than triggering the rules in parallel. Further, reversing the order in which the cycles fire can produce different results. One skilled in the art will also appreciate that domain expertise is generally required to decide how to resolve cycles.

Now suppose Facility_Connection had the following chase rules:

| | |
|---|---|
| Facility_Connection < From_Facility | 1 Facility |
| Facility_Connection > To_Facility | 2 Facility |
| Facility_Connection < From_Facility | 3 Facility |
| Facility_Connection > To_Facility | 4 Facility |

The order of chasing would be as follows:
1) Facility>Facility_Connection (From_Facility)
2) Facility_Connection (To_Facility)>Facility
3) Facility>Facility_Connection (From_Facility)
4) Facility_Connection (To_Facility)>Facility Once again, the two cycles are traversed in serial. This is considered to be one cycle of a length 4 (Facility>Facility_Connection>Facility>Facility_Connection>Facility).

One skilled in the art will appreciate that the repetition of chase rules along with the use of Head and Offset gives the administrator a great deal of control over the order in which chase rules are executed.

In one or more embodiments of the invention, a improper cycle may be detected by initially performing a depth first search of a graph of the entities/rules to determine a dependency tree. Next, the tail of cycles are removed and the tree is analyzed. Upon performing analysis, a determination is made whether any tails remain. If so, an improper cycle is detected.

Chasing rules are different depending on the type of action being performed. Below, the changing rules for a full export, a partial export, an incremental export, a focused incremental export are discussed. This list of actions is not exhaustive as other types of actions may be contemplated.

Full Export

A full export of data refers to applying the chasing rules to the initial seed entities and exporting all the selected entities regardless of when they were last updated. Although it makes sense to perform a full export the first time data are transferred from one data store to another, it is inefficient to synchronize data stores by repeatedly transferring huge amounts of data when there are few changes. One skilled in the art will appreciate that this does not mean that all the entities in the data store are exported. For example, a full export can always be imported into any self-consistent target data store, either empty or populated.

In order to generate a full export of data from Seabed, the following steps should be followed in the source data store in accordance with one or more embodiments of the invention.

First, the SDS_Move table is populated with the seed entities to be exported. Next, the SDS_Chase_Full procedure is run to apply the chasing rules. The seed entities can be populated via SQL statements, such as:

```
insert into SDS_Move (Move_Id, Move_Entity) values(100735, 'Well');
insert into SDS_Move (Move_Id, Move_Entity) values(101026, 'Activity_Program');
```

For each chase rule in the specification, the SDS_Chase_Full procedure contains an SQL insert statement that adds new entries into the SDS_Move table based on the current contents of the SDS_Move table. The order of these statements is critical in order to achieve a complete chasing with minimal number of statements.

After the SDS_Chase_Full procedure completes, the SDS_Move table lists all the entities to be exported. Example contents of the SDS_Move table are shown below:

| Select * from SDS_Move | |
| --- | --- |
| Move_Id | Move_Entity |
| 101026 | Activity_Program |
| 101286 | AFE_Currency_Component |
| 101287 | AFE_Status |
| −100047 | BA_Association |
| −100045 | BA_Association |
| 101290 | Base_Fluid_Used |
| 101326 | Borehole_Activity_Detail |
| 101382 | Borehole_Activity_Detail |
| 101449 | Borehole_Status |
| 101450 | Borehole_Status |
| 102737 | Coordinate_System |
| 101483 | Cost_Allocation_Value |
| 101484 | Cost_Allocation_Value |
| 102744 | Field |
| ... | |

The positive IDs in the SDS_Move table refer to entities in the current data store. The negative IDs refer to shared entities in a data dictionary. These shared entities are visible from every data store using that data dictionary. The full scope of the problem includes the transfer of both entities in the data store and shared entities in the data dictionary from one database instance to another database instance with a different data dictionary. In the case of a data transfer from one data store to another data store using the same data dictionary, there is no need to transfer the shared entities.

The SDS_Chase_Full procedure contains SQL statements of the following form:

```
insert into SDS_Move (Move_Id, Move_Entity)
select distinct Id, 'Activity_Program'
    from Activity_Program, SDS_Move where Well_Id = Move_Id
    and Id not in (select Move_Id from SDS_Move)
insert into SDS_Move (Move_Id, Move_Entity)
select distinct Id, 'Borehole'
    from Borehole, SDS_Move where Well_Id = Move_Id
    and Id not in (select Move_Id from SDS_Move)
insert into SDS_Move (Move_Id, Move_Entity)
select distinct Surface_Location_Id, 'Position'
    from Well, SDS_Move where Id = Move_Id
    and Surface_Location_Id not in (select Move_Id from SDS_Move)
insert into SDS_Move (Move_Id, Move_Entity)
select distinct Id, 'Well_AFE'
    from Well_AFE, SDS_Move where Well_Id = Move_Id
```

```
    and Id not in (select Move_Id from SDS_Move)
insert into SDS_Move (Move_Id, Move_Entity)
select distinct Id, 'Well_Alias'
    from Well_Alias, SDS_Move where Well_Id = Move_Id
    and Id not in (select Move_Id from SDS_Move)
...
```

Chasing data can be a tricky business because one instance of an entity can have references to other instances that have references to other instances and so on. If all the links are always followed, then too many data, possibly the entire database, is transferred. A chasing engine on the other hand follows the chasing rules to decide which links are to be followed and which entities are to be transferred.

Special attention is paid to links to those entities that are not intended to be transferred. Otherwise, these links are diagnosed as violations of referential integrity. There is no need to trim data attributes that are not links since they do not cause violations in referential integrity.

Occasionally, a data exporter must trim the references in memory before writing the entities to the external format. For such a situation, the SDS_Move table specifies which entities should be exported. Thus, references to entities that are not listed in the SDS_Move should be trimmed.

Partial Export

A partial export refers to an export in which the full chasing rules are not applied. Since references to entities not transferred are trimmed during import, some links can be lost or the import can fail due to missing mandatory links. Nevertheless, partial transfers are often used as part of a data synchronization strategy because they are more efficient than full transfers.

In general, a partial export succeeds if the source database is intended to be a subset of the target database (e.g., if the database at the rig is a subset of the centralized database). Any violations will be reported in the SDS_Violation table and the import is aborted to avoid corruption of the target data store.

Even with a partial export, some chasing is required in order to provide the context entities to merge entities at the target data store. For example, the match rule for a Well_Alias refers to Alias_Type and Well_Id. This Well_Id is a surrogate Id, so the corresponding Well instance must be included as a context entity when a Well_Alias is exported.

In a partial export, in accordance with one or more embodiments of the invention, the following steps are executed in the source data store: (1) populate SDS_Move table with entities to be transferred; and (2) run SDS_Chase_Context procedure to add required context entities. After these steps are followed, the SDS_Move table specifies the entities to be exported.

The chasing statements in the SDS_Chase_Context procedure are similar to the statements in the SDS_Chase_Full procedure but they often chase in the opposite direction. The context chasing statements for a given entity are generated according to entity references in the match rule for that entity. If the match rule can be specified via match attributes, then a simple context chasing statement of the following form is generated:

```
insert into SDS_Move (Move_Id, Move_Entity)
select distinct Well_Id, 'Well'
```

-continued

```
    from Well_Alias, SDS_Move
    where Id = Move_Id
        and Well_Id not in (select Move_Id from SDS_Move)
```

More complex statements are generated when the match rule specification language is used. For example, the context chasing statement for Bent_Sub is as follows:

```
    insert into SDS_Move (Move_Id, Move_Entity)
    select distinct A.Entity_Id, A.Entity_Type
        from SDS_Move M, Assoc_A, Facility_Composition X
        where M.Move_Entity = 'Bent_Sub'
            and A.Property_Id = M.Move_Id
            and A.Property_Code = 'Part_Facility'
            and A.Entity_Type = 'Facility_Composition'
            and A.Entity_Id not in (select Move_Id from SDS_Move)
            and X.Id = A.Entity_Id
            and X.Whole_Facility_Tbl ='BHA'
```

One skilled in the art will appreciate that if the match rule for an entity does not require any context, then no context chasing is done for that entity even when a relationship is mandatory. In one or more embodiments of the invention, the Merge Engine does not complain about missing mandatory attributes in the staging area provided that a match exists in the target data store.

Incremental Export

An incremental export is meant to increase the efficiency of data synchronization by transferring only data that has changed since a given point in time. This is a challenging task because it is not sufficient to move only data that have been changed. The merge engine may require other entities as context so it can decide when a match exists. Hence, the match rules used by the merge engine have an impact on the chasing done during an incremental export.

In one or more embodiments of the invention, an incremental export is generated when the following steps are followed in the source data store: (1) run SDS_Chase_Seed to populate SDS_Move table with changed entities; and (2) run SDS_Chase_Incr procedure to add references from changed entities. After these steps are followed, the SDS_Move table specifies the entities to be exported.

In one or more embodiments of the invention, the SDS_Chase_Seed procedure must be called with a parameter @p_Date that specifies the date after which updates are to be considered. This procedure contains statements of the following form:
insert into SDS_Move (Move_Id, Move_Entity)
select Id, 'Well'
    from Well where Update_Date>@p_Date After the SDS_Chase_Seed procedure has executed, the SDS_Move table contains only entities that have changed since the specified date. It is safe for the exporter to add additional entries into the SDS_Move table at this time. The SDS_Chase_Incr procedure adds all referenced entities from selected changed entities to the SDS_Move table. SDS_Chase_Context is then called to add the required context entities. One skilled in the art will appreciate that in some data transfer workflows, it may be sufficient to call SDS_Chase_Context directly instead of SDS_Chase_Incr.

Focused Incremental Export

Even in the case of an incremental export, it may be desirable to move only a subset of changed data. For example, a user of a data store at the rig site may want to transfer only recently changed data about one well but not about another well. This is called a focused incremental export and it is impacted by the chase rules from the entities in the focus (i.e., the well).

In order to generate a focused incremental export, the following steps should followed in the source data store, in accordance with one or more embodiments of the invention: (1) populate the focus entities in the SDS_Move table; (2) run SDS_Chase_Filter to determine changed entities within the focus; and (3) run SDS_Chase_Incr procedure to add references from changed entities. After these steps are followed, the SDS_Move table specifies the entities to be exported.

In one or more embodiments of the invention, the focus entities can be populated via the following SQL statements:

insert into SDS_Move (Move_Id, Move_Entity) values (100735, 'Well');

The SDS_Chase_Filter procedure must be called with a parameter @p_Date that specifies the date after which updates are to be considered. First, the SDS_Chase_Full procedure computes all entities within the focus. Then entities from the SDS_Move table that are unchanged since the specified date are deleted. This procedure contains statements of the following form:
delete from SDS_Move where Move_Entity='Well'
    and Move_Id in (select Id from Well where Update_Date<=@p_Date)

After the SDS_Chase_Filter procedure has been executed, the SDS_Move table contains only changed entities within the initial focus. One skilled in the art will appreciate that the exporter is safe to add additional entries into the SDS_Move table. The SDS_Chase_Incr procedure adds all referenced entities from changed entities to the SDS_Move table. Finally, SDS_Chase_Context is called to add the required context entities.

Analyze The Chasing Procedure

Returning to FIG. 4, after the administrator has loaded the chasing specification (Step 402), the SDS_Chase_Analyze procedure must be executed to analyze the specification for consistency (Step 403). When determining consistency, the analysis may be performed syntactically and semantically. For example, the syntactical analysis examines whether the chasing specification uses the wrong format (i.e., misspelled words, too many parameters, etc.) or fails to comply with the rules or grammar. Semantic analysis requires an examination that involves not only way the syntax used but also the result of (or relationship formed by) the syntax.

An error message or warning is produced if the specification is not consistent (Step 405) (e.g., there is a chase rule from an abstract entity, an entity with a chase rule does not have a match rule because it cannot be synchronized unless the GUID option is used in the match step, when a mandatory relationship is not specified in a chase rule, etc.). If an error is reported or a warning indicates a genuine problem, the administrator should revise the chasing specification and repeat the analysis. One skilled in the art will appreciate that in the case of a semantic ambiguity, an obvious correction (i.e., a correction where the semantic ambiguity has an obvious mistake that is simply corrected) may be performed to allow the process to continue without an error message. However, if an obvious correction is made, a warning message is appropriate.

The chase rules are specified without indicating the order in which they should fire. The analysis procedure determines the order. As described above, in one or more embodiments of the invention, the tail of each cycle is dropped when building a dependency tree to determine the order in which chase rules must fire. If there were no taxonomic hierarchy (i.e., in a traditional relational database), then it is trivial to determine the order. However, Seabed, like an object database, supports relationships to abstract entities in the taxonomic hierarchy. Thus, additional techniques are necessary to reflect the dependencies due to the taxonomic hierarchy.

In one or more embodiments of the invention, a first technique is to generalize the source of a rule. Suppose there exists a chase rule whose target is abstract class P (for Parent). Suppose also, there is a chase rule R from class C (for Child) to class T (for Target) such that C is a descendant of P. Since the rule to class P can induce instances of class C, we can safely capture the dependency by generalizing the source of rule R from class C to class P.

In one or more embodiments of the invention, the second technique is to generalize the target of a rule. Suppose there exists a chase rule R from class S (for Source) to class target C (for Child). Suppose class P (for Parent) is an ancestor of class C. Since every instance of class C is also an instance of class P, we can safely capture the dependency by generalizing the target of rule R from class C to class P.

Note that in both cases, we generalize the rule to determine when it should fire. When rule R actually fires, it will fire only for instances of class C.

After generalizing the rules according to the taxonomic hierarchy, there may be cases where one dependency subsumes another. For example, if there is a dependency from class P to T and from class C to T, where C is a descendant of P, then this dependency may be safely removed from the dependency graph. After deleting the redundant dependencies, the rank of the entities can now be determined in the dependency graph.

The dependency graph contains edges induced by rules that are on a cycle (cycle dependencies) and edges for rules that are not on a cycle (tree dependencies). For each class X which is not on a cycle, the Rank of class X is 1 plus the maximum rank of any entity Y for which there is a tree dependency from X to Y. On the other hand, for each class X which is on a cycle, the rank of class X is the rank of the head of cycle plus the pre-ordained offset of the entity. One more adjustment is necessary in order to accommodate the taxonomic hierarchy. The Rank of class C is taken to be the maximum Rank of class P, where P is an ancestor of class C and there exists a dependency to class P.

Given the above rank computation rules, we use a simple propagation technique that computes the current rank of each entity in a loop according to the rank of each entity in the previous loop. Since no cycle exists in the dependency graph, the ranks stabilize after a few iterations through the loop.

The actual rank of a given chase rule is now computed as follows. If there is a chase rule from X to Y and X is not part of a cycle, then the rank of the rule is taken from the dependency graph. If however, X is part of a cycle with Head H, the rank of the rule is the sum of the Rank of the H from the dependency graph plus the original offset in the cycle specification.

For example, if there is a chase rule from Well to Borehole and a chase rule from Borehole to Well_Marker, the chase rule from Well must fire before the chase rule from Borehole in order to guarantee that all Well_Markers are picked up.

Completion Based On Purpose

As opposed to the Chasing Engine selecting entities from a source data store to be merged at a target data store, the Chasing Engine may also used to support complex deletion rules. In both cases, the input to the Chasing Engine is a set of chase rules and a set of seed entities.

In one or more embodiments of the invention, the completion rules built into the Chasing Engine depend on the purpose of chasing. Consider first chasing for the purpose of merge. For every entity type E that is a target of a chase rule, the Chasing Engine automatically adds rule E>R, where R is a mandatory relationship of E. Also, for each entity type E, the Chasing Engine automatically adds rule E>R if relationship R is part of the match rule for Entity E.

Now consider chasing for the purpose of Deletion. For every entity type D that is a target of a chase rule, the Chasing engine automatically adds rule E<R, where R is a mandatory relationship of E and D is the domain of relationship R.

One skilled in the art will appreciate by using completion rules in the manner described above (i.e., the automatic completion of match rules according to purpose), reduced the total effort required to define the match rules.

Generating The Chasing Procedures

As described above, the chasing engine is a package of stored procedures (i.e., chasing procedures) in a data dictionary, which are generated from the chasing specification (Step 404).

Based on the chasing specification, the chasing engine generates several stored procedures that are invoked during the export of data from the source data store and the import of data into the target data store. In one or more embodiments of the invention, the SDS_Chase_Gen procedure is used to generate all the chasing procedures from the analyzed chasing specification. After the SDS_Chase_Gen procedure is executed, the administrator executes the contents of the output buffer to install the stored procedures in the source data store and the staging area of the target data store.

One skilled in the art will appreciate that the logic used to generate the chasing procedures can easily be adapted to execute dynamic SQL directly. The stored procedures have the advantage of better performance and they can be reused for data transfer workflows that are repeated. The dynamic SQL requires less setup time and may be more appropriate for one-shot data transfers.

This section refers to the default names of stored procedures generated by the chasing engine. The SDS_Chase_Gen procedure supports an optional argument to override the prefix in the name of the generated procedures in order to simultaneously support multiple data transfer workflows. For example, by passing in the prefix DailyDrilling, the SDS_Chase_Full procedure is renamed DailyDrilling_Full for the daily drilling data transfer workflow.

Data Transport

The actual transportation of data from the source data store to the staging area, shown as Step 408 of FIG. 4, is not in the primary scope of the chasing engine. Specifically, data exporters can query the SDS_Move table directly to determine which entities to move.

For example, the SDS_Chase_Gen_Insert procedure in the chasing engine can be used to generate a script of SQL insert statements based on the contents of the SDS_Move table. The execution of the generated script in the context of the staging area will accomplish the transportation of data. The advantage of this SQL script is that it will work for both Oracle® and SQL Server.

One skilled in the art will appreciate that a more complicated variation is to generate comma-separated files to be loaded into the staging area by native database loaders (bcp on SQL Server or sqlldr on Oracle®). This is the most efficient approach for large data transfers, but it also requires the generation of platform-specific control files to load the data.

In the case of one Seabed data synchronization workflow, the chasing engine was augmented to generate XML statements of the following form to move the data:

```
</Entity>
<Entity Name="Well">select * from $SOURCE.dbo.Well where Id in
(select Move_Id from $SOURCE.dbo.SDS_Move where Move_Entity =
'Well')
</Entity>
```

Ultimately all old IDs from the source data store must be mapped to new IDs in the staging area. In the case of the XML transfer, the XML reader does the ID mapping. In order to facilitate this mapping, the data dictionary contains a Meta_Surrogate table that specifies each entity type and attribute that requires an ID mapping in accordance with one or more embodiments of the invention.

| select * from Meta_Surrogate | | |
| --- | --- | --- |
| Entity | Attribute | Scope |
| Activity_BA_Invl | Business_Associate_Id | Client |
| Activity_Program | Activity_Template_Id | Project |
| Borehole_Section | Borehole_Id | Project |
| Borehole_Status | Borehole_Id | Project |
| Casing | Address_Id | Client |
| ... | | |

The Scope column specifies which Id space to use. A separate ID space is included for each data store (Project scope) and a common ID space for shared data (Client scope).

If a SQL script were to be used to move the data from the source data store to the staging area of the target data store to accomplish Step 408 of FIG. 4, the following steps should be followed in the staging area:

Run the Scan step to identify the tables that have data

Run the Validate step with the Trim option to trim extraneous references

Run the Match step to record matches in the SDS_Match table

Optionally run the Conflict Resolution step

Run the Update step with the Map option to prepare the data for merging

Run the Merge step to perform the actual merge

While the chase engines in accordance with embodiments of the invention has been illustrated based on implementations in a special-purpose data repository Seabed, which in turn is based on commercial DBMS Oracle® and SQL Server, other data repositories or DBMS in the art or subsequently developed, may also take advantage of these database merging methods.

Embodiments of the present invention may be implemented with various computers, such as workstations, PCs, laptops, servers, and supercomputers. Further, the invention may be implemented on virtually any type of computer regardless of the platform being used. For example, a computer system includes a processor, associated memory, a storage device, and numerous other elements and functionalities typical of today's computers (not shown). The computer system may also include input means, such as a keyboard and a mouse, and output means, such as a monitor. The computer system is connected to a local area network (LAN) or a wide area network (e.g., the Internet) via a network interface connection (not shown). Those skilled in the art will appreciate that these input and output means may take other forms.

Further, those skilled in the art will appreciate that one or more elements of the aforementioned computer system may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources.

Software instructions to perform embodiments of the invention may be stored on a computer readable medium such as a compact disc (CD), a diskette, a tape, a file, or any other computer readable storage device. Furthermore, various memories (or storage means) may be used to store programs having instructions for performing the techniques of the present invention. The program of instructions may be in object code or source code. The precise form of the program storage device and of the encoding of instructions is immaterial for the purposes of this invention.

Advantages of the present invention include, but are not limited to, the following. With the use of the chasing engine, the chasing code for a data transfer is generated automatically from the high-level chasing specification. Any inconsistencies in the specification are reported by the chasing engine. Data transfer using the chasing engine is efficient. The chasing procedures are generated in advance for optimal performance.

Further, the database runs on both Oracle® and SQL Server. The chasing engine allows data synchronization between data stores of both platforms. The chasing engine supports multiple data transfer workflows with different chasing rules. The chasing engine automatically generates the context chasing rules for a partial data transfer from the match rules. This includes sophisticated match rules defined via the match rule specification language.

Further, the chasing engine supports incremental data transfer and focused incremental data transfer. The chasing engine gives the administrator control over how cycles are to be handled.

Further, the chase engines support efficient cloning of a network of entities. First, the chasing rules are used to grow the desired network. Then, the data is copied to a staging area where it can be edited. Finally, the data is grafted back to the target project by the merge engine.

Further, the end user of a data transfer workflow needs no special domain knowledge. In the case of a full export, the user needs to only specify the seed entities. For an incremental export, the date after which updates are to be considered must be specified. In a focused incremental export, the focus entities must also be specified.

In particular, in accordance with one or more embodiments of the invention, these features may be particularly beneficial to oil and gas industry applications.

While the invention has been described with respect to a limited number of embodiments, those skilled in the art, having benefit of this disclosure, will appreciate that other embodiments can be advised which do not depart from the scope of the invention as disclosed herein. Accordingly, the scope of the invention should be limited only by the attached claims.

What is claimed is:

1. A system for transferring data comprising:
   a processor; and
   a memory operating under the control of the processor and storing a data repository defined by a single logical specification, comprising:
   a first data store comprising a plurality of tables, a view of the plurality of tables, and a seed entity;
   a data dictionary comprising a meta-table and means to generate the first data store, wherein the meta-table is generated from the single logical specification defining the data repository;
   a first chase rule comprising the seed entity, a first related entity, a first link between the seed entity and the first related entity, and a direction of the first link;
   a chasing specification defined by the first chase rule; and
   a chase engine configured to generate a plurality of chasing procedures from the chasing specification and transfer the seed entity from the first data store to a second data store by executing said plurality of chasing procedures,
   wherein a first chasing procedure of the plurality of chasing procedures requires transferring the first related entity to the second data store.

2. The system of claim 1, wherein the chasing engine is further configured to identify and report an inconsistency in the chasing specification.

3. The system of claim 1, wherein the first data store belongs to a first database platform and the second data store belongs to a second database platform.

4. The system of claim 1, wherein the chasing engine supports incremental data transfer and focused incremental data transfer.

5. The system of claim 1, further comprising:
   a second chase rule identifying a second related entity, the first related entity, a second link between the second related entity and the first related entity, and a direction of the second link,
   wherein the chasing specification is further defined by the second chase rule, and
   wherein a second chasing procedure of the plurality of chasing procedures requires transferring the second entity to the second data store.

6. The system of claim 5, further comprising:
   a first cycle comprising the first link and the second link;
   a first offset attribute associated with the first chase rule; and
   a second offset attribute associated with the second chase rule,
   wherein the first offset attribute and the second offset attribute specify an order of the first chase rule and the second chase rule in the first cycle.

7. The system of claim 6, further comprising:
   a third chase rule identifying a third related entity, the seed entity, a third link between the third related entity and the seed entity, and a direction of the third link,
   wherein the third chase rule is associated with a second cycle,
   wherein the chasing specification is further defined by the third chase rule, and
   wherein the first cycle and the second cycle are traversed in parallel to generate the plurality of chasing procedures.

8. The system of claim 6, further comprising:
   a dependency graph comprising a plurality of edges induced by at least one selected from a group consisting of the first chase rule and the second chase rule.

9. The system of claim 1, further comprising:
   a move table comprising the seed entity and the first related entity, wherein the plurality of chasing procedures are generated using the move table.

10. A method of transferring data, comprising:
    obtaining a seed entity to transfer from a first data store to a second data store;
    obtaining a chasing specification defining at least one domain of a data repository comprising the first data store, wherein the chasing specification is defined by a first chasing rule identifying the seed entity, a first related entity, a first link between the seed entity and the first related entity, and a direction of the first link;
    generating a plurality of chasing procedures based on the chasing specification after obtaining the seed entity; and
    transferring the seed entity from the first data store to the second data store by executing the plurality of chasing procedures,
    wherein a first chasing procedure of the plurality of chasing procedures requires transferring the first related entity to the second data store.

11. The method of claim 10, wherein the chasing specification is further defined by:
    a second chase rule specifying a second related entity, the first related entity, a second link between the second related entity and the first related entity, and a direction of the second link,
    wherein a second chasing procedure of the plurality of chasing procedures requires transferring the second related entity to the second data store.

12. The method of claim 11, wherein the chasing specification is further defined by:
    a head entity identifying a first cycle comprising the first link and the second link;
    a first offset attribute associated with the first chase rule; and
    a second offset attribute associated with the second chase rule,
    wherein the first offset attribute and the second offset attribute specify an order of the first chase rule and the second chase rule in the first cycle.

13. The method of claim of claim 12, wherein the chasing specification is further defined by:
    a third chase rule identifying a third related entity, the seed entity, a third link between the third related entity and the seed entity, and a direction of the third link,
    wherein the third chase rule is associated with a second cycle, and
    wherein the first cycle and the second cycle are traversed in parallel to generate the plurality of chasing procedures.

14. The method of claim 12, wherein generating the plurality of chasing procedures comprises:

generating a dependency graph comprising an edge induced by the first chase rule;

summing a rank of the head entity in the dependency graph with the first offset attribute to generate a rank of the first chase rule.

15. The method of claim 10, wherein generating the plurality of chasing procedures comprises:

populating a move table including the seed entity and the first entity based on the chasing specification;

applying a filter to the move table to identify an updated entity.

16. A computer readable medium encoded with a computer program for transferring data, the computer program executable by a computer and comprising functionality to:

obtain a seed entity to transfer from a first data store to a second data store;

obtain a chasing specification defining at least one domain of a data repository comprising the first data store, wherein the chasing specification is defined by a first chase rule identifying the seed entity, a first related entity, a first link between the seed entity and the first related entity, and a direction of the first link;

generate a plurality of chasing procedures based on the chasing specification after obtaining the seed entity; and transfer the seed entity from the first data store to the second data store by executing the plurality of chasing procedures, wherein a first chasing procedure of the plurality of chasing procedures requires transferring the first related entity to the second data store.

17. The computer readable medium of claim 16, wherein the chasing specification is further defined by:

a second chase rule specifying a second related entity, the first related entity, a second link between the second related entity and the first related entity, and a direction of the second link, wherein a second chasing procedure of the plurality of chasing procedures requires transferring the second related entity to the second data store.

18. The computer readable medium of claim 17, wherein the chasing specification is further defined by:

a head entity identifying a first cycle comprising the first link and the second link;

a first offset attribute associated with the first chase rule; and a second offset attribute associated with the second chase rule, wherein the first offset attribute and the second offset attribute specify an order of the first chase rule and the second chase rule in the first cycle.

19. The computer readable medium of claim 18, wherein the chasing specification is further defined by:

a third chase rule identifying a third related entity, the seed entity, a third link between the third related entity and the seed entity, and a direction of the third link, wherein the third chase rule is associated with a second cycle, and wherein the first cycle and the second cycle are traversed in parallel to generate the plurality of chasing procedures.

20. The computer readable medium of claim 16, wherein the computer program further comprises functionality to:

populate a move table including the seed entity and the first entity based on the chasing specification;

apply a filter to the move table to identify an updated entity.

* * * * *